United States Patent
Wang et al.

(10) Patent No.: US 9,794,690 B2
(45) Date of Patent: *Oct. 17, 2017

(54) WIRELESS SPEAKER SYSTEM AND WIRELESS DATA TRANSMISSION METHOD

(71) Applicant: SENGLED OPTOELECTRONICS CO., LTD., Tongxiang (CN)

(72) Inventors: Xia Wang, Tongxiang (CN); Jianbing Zheng, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 53 days.

This patent is subject to a terminal disclaimer.

(21) Appl. No.: 14/780,508

(22) PCT Filed: Mar. 31, 2015

(86) PCT No.: PCT/CN2015/075464
§ 371 (c)(1),
(2) Date: Sep. 25, 2015

(87) PCT Pub. No.: WO2015/149678
PCT Pub. Date: Oct. 8, 2015

(65) Prior Publication Data
US 2016/0050493 A1  Feb. 18, 2016

(30) Foreign Application Priority Data
Apr. 4, 2014  (CN) .......................... 2014 1 0135703

(51) Int. Cl.
*H04R 3/12* (2006.01)
*H05B 37/02* (2006.01)
(Continued)

(52) U.S. Cl.
CPC ............. *H04R 3/12* (2013.01); *F21V 23/045* (2013.01); *F21V 33/0056* (2013.01);
(Continued)

(58) Field of Classification Search
None
See application file for complete search history.

(56) References Cited

U.S. PATENT DOCUMENTS

2007/0142024 A1* 6/2007 Clayton ................. H04H 20/08
455/403
2008/0175399 A1* 7/2008 Kim ......................... H03G 3/32
381/57
(Continued)

FOREIGN PATENT DOCUMENTS

CN    202172486 U    3/2012
CN    102724609 A    10/2012
(Continued)

OTHER PUBLICATIONS

Andry, Tom, "Klipsch LightSpeaker System Architectural Speaker First Look." pp. 1-3. Jan. 13, 2010.*
(Continued)

*Primary Examiner* — Curtis Kuntz
*Assistant Examiner* — Qin Zhu
(74) *Attorney, Agent, or Firm* — Anova Law Group, PLLC

(57) ABSTRACT

A wireless speaker system is provided. The system includes at least one main light emitting diode (LED) lighting device including a Bluetooth module and a wireless audio module. The system also includes at least one auxiliary LED lighting device including a wireless audio module. Further, the system includes a smart terminal configured to send data to the main LED lighting device through a Bluetooth protocol. The wireless audio module in the main LED lighting device
(Continued)

transmits the data to the auxiliary LED lighting device. The auxiliary LED lighting device sends feedback data to the smart terminal through the main LED lighting device.

16 Claims, 2 Drawing Sheets

(51) Int. Cl.
    *F21V 33/00*     (2006.01)
    *F21V 23/04*     (2006.01)
    *H04L 12/28*     (2006.01)
    *F21Y 115/10*     (2016.01)

(52) U.S. Cl.
    CPC ..... *H04L 12/2827* (2013.01); *H05B 37/0272* (2013.01); *F21Y 2115/10* (2016.08); *H04L 2012/2841* (2013.01); *H04L 2012/2849* (2013.01); *H04R 2420/07* (2013.01); *Y02B 20/48* (2013.01)

(56) References Cited

U.S. PATENT DOCUMENTS

| | | | | |
|---|---|---|---|---|
| 2008/0279138 | A1* | 11/2008 | Gonikberg | H04W 8/005 370/328 |
| 2011/0317846 | A1* | 12/2011 | Yuan | F21V 33/0056 381/77 |
| 2013/0272276 | A1* | 10/2013 | Sakamoto | H04W 72/12 370/336 |
| 2014/0009068 | A1* | 1/2014 | Ivey | H05B 33/0854 315/152 |
| 2014/0064513 | A1* | 3/2014 | Behringer | H04R 3/00 381/77 |
| 2014/0252958 | A1* | 9/2014 | Subotnick | H05B 37/0218 315/149 |
| 2014/0285113 | A1* | 9/2014 | Huang | H05B 37/0272 315/297 |
| 2015/0043212 | A1* | 2/2015 | Coffey | F21V 23/045 362/294 |
| 2015/0120000 | A1* | 4/2015 | Coffey | H04L 12/2803 700/13 |

FOREIGN PATENT DOCUMENTS

| | | |
|---|---|---|
| CN | 203395663 U | 1/2014 |
| CN | 103697354 A | 4/2014 |
| CN | 103925583 A | 7/2014 |

OTHER PUBLICATIONS

Strange, Adario, "Smart Light Bulb Doubles as Bluetooth Speaker." pp. 1-3. Mar. 19, 2014.*
The World Intellectual Property Organization (WIPO) International Search Report for PCT/CN2015/075464 dated Jun. 8, 2015.

* cited by examiner

WIRELESS SPEAKER SYSTEM AND WIRELESS DATA TRANSMISSION METHOD

CROSS-REFERENCES TO RELATED APPLICATIONS

This application is a national phase entry under 35 U.S.C. §371 of International Application No. PCT/CN2015/075464, filed on Mar. 31, 2015, which claims the priority to Chinese Patent Application No. 201410135703.5, filed on Apr. 4, 2014, the entire contents of all of which are incorporated herein by reference.

FIELD OF THE INVENTION

The present disclosure generally relates to the field of light emitting diode (LED) lighting technology and wireless speaker technology and, more particularly, relates to a wireless speaker system and a wireless data transmission method.

BACKGROUND

LED lighting may generally provide advantages in energy conservation, environmental protection, controllable lighting, solid state lighting, and long operational lifetime. LED lamps thus have been widely used in various areas for public, commercial, and/or indoor lighting.

For example, a wireless speaker system can be combined with an LED lighting device. Through Bluetooth technology, a smart terminal can share an audio signal to the LED lighting device having a Bluetooth module to play the audio. However, in an existing system of the wireless speakers combining with the LED lighting devices, when playing the audio signal, a specified wireless transmitter needs to be added to control and send the audio signal. The wireless transmitter may be large and expensive, which would not be suitable to be used with smart terminals, such as mobile phones. The compatibility of such devices is poor and they are unable to adapt to more applications. In addition, the existing wireless speaker system often only includes a single LED lighting device and can only play in mono. Therefore, a stereo wireless speaker system may not meet a user's needs.

The disclosed wireless speaker systems and wireless data transmission methods are directed to solve one or more problems set forth above and other problems.

BRIEF SUMMARY OF THE DISCLOSURE

One aspect of the present disclosure includes a wireless speaker system. The system includes at least one main light emitting diode (LED) lighting device including a Bluetooth module and a wireless audio module. The system also includes at least one auxiliary LED lighting device including a wireless audio module. Further, the system includes a smart terminal configured to send data to the main LED lighting device through a Bluetooth protocol, such that the wireless audio module in the main LED lighting device transmits the data to the auxiliary LED lighting device, and the auxiliary LED lighting device sends feedback data to the smart terminal through the main LED lighting device.

Another aspect of the present disclosure includes a wireless data transmission method between a smart terminal and an LED lighting device including a main LED lighting device having address information and at least one auxiliary LED lighting device having address information. The method includes the smart terminal sending data to the main LED lighting device, such that the main LED lighting device confirms the address information and sends the data to the corresponding auxiliary LED lighting device based on the address information. The method also includes the smart terminal receiving feedback data sent by the main LED lighting device and feedback data that is sent by the auxiliary LED lighting device and transmitted through the main LED lighting device.

Another aspect of the present disclosure includes a wireless data transmission method using at least one main LED lighting device and at least one auxiliary LED lighting device. The method includes the main LED lighting device receiving data sent from a smart terminal through a Bluetooth module. The method also includes the main LED lighting device sending the data from the smart terminal to the auxiliary LED lighting device through a wireless signal. Further, the method includes the main LED lighting device transmitting feedback data from the auxiliary LED lighting device to the smart terminal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
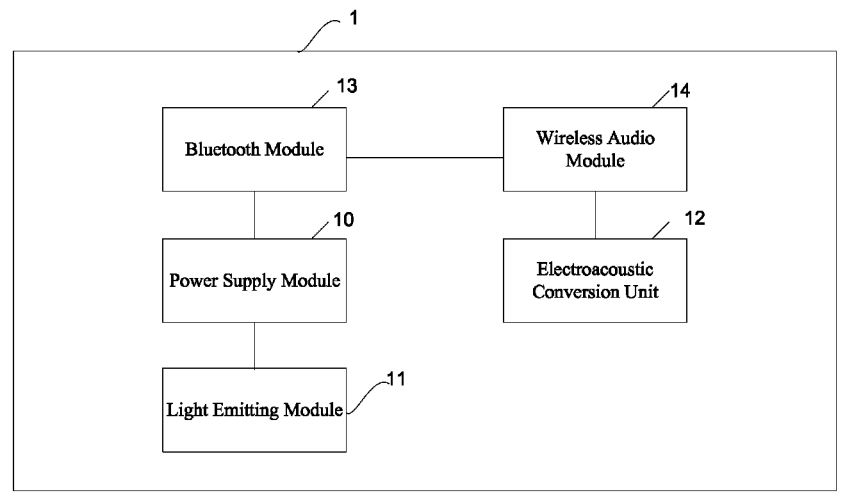
FIG. 1 illustrates a schematic diagram of an exemplary main LED lighting device consistent with the disclosed embodiments.
Figure 2:
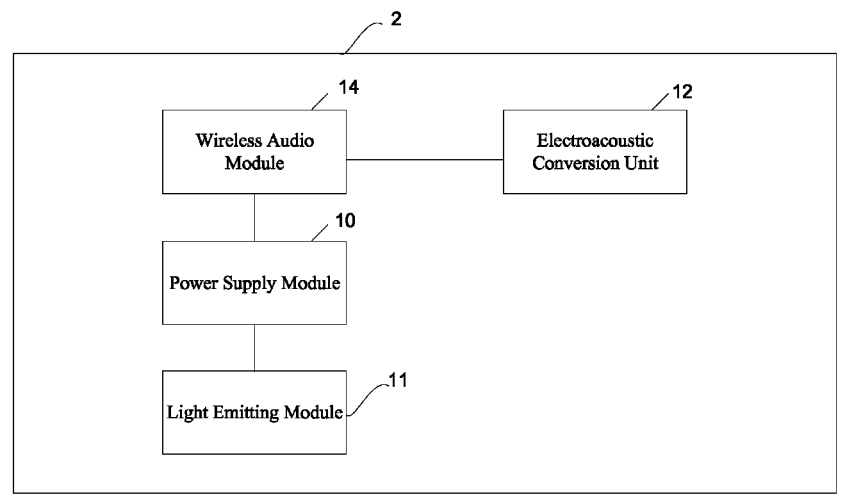
FIG. 2 illustrates a schematic diagram of an exemplary auxiliary LED lighting device consistent with the disclosed embodiments.

FIG. 1 illustrates a schematic diagram of an exemplary main LED lighting device consistent with the disclosed embodiments. FIG. 2 illustrates a schematic diagram of an exemplary auxiliary LED lighting device consistent with the disclosed embodiments. As shown in FIG. 1 and FIG. 2, the LED lighting device includes a main LED lighting device 1 and an auxiliary LED lighting device 2. Similar to the structure of conventional LED lamps, the main LED lighting device and the auxiliary LED lighting device include a power supply module 10 and a light emitting module 11 connected to the power supply module, respectively. The power supply module and the light emitting module are configured to provide a power source for the LED lighting device. In addition, the main LED lighting device and the auxiliary LED lighting device also include an electroacoustic conversion unit 12, respectively.

The difference between the main LED lighting device and the auxiliary LED lighting device is that the main LED lighting device includes a Bluetooth module 13 and a wireless audio module 14, whereas the auxiliary LED lighting device only includes the wireless audio module 14. The Bluetooth module 13 in the main LED lighting device can communicate with a smart terminal 3 using a Bluetooth protocol. The wireless audio module 14 in the main LED lighting device 1 can communicate with the wireless audio module 14 in the auxiliary LED lighting device 2. The wireless audio module 14 in the main LED lighting device 1 is configured to receive an audio signal or a control signal through the Bluetooth module 13, convert and send the audio signal or the control signal to the wireless audio module 14 in the auxiliary LED lighting device 2.

Figure 3:
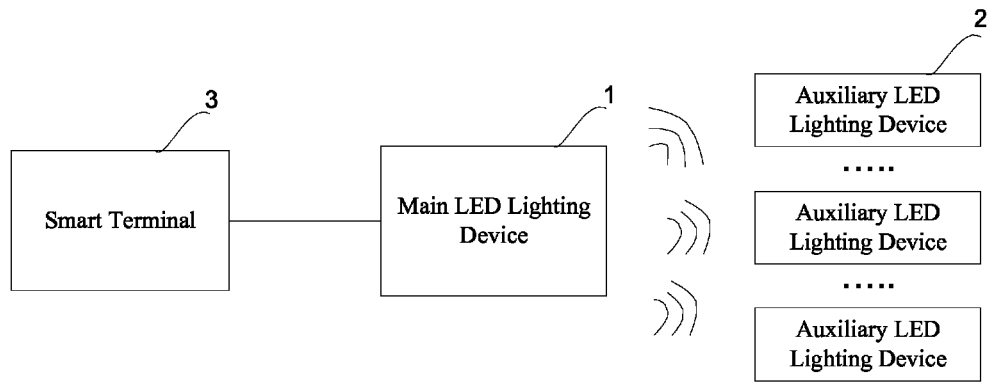
FIG. 3 illustrates a structure diagram of an exemplary wireless speaker system consistent with the disclosed embodiments.

FIG. 3 illustrates a structure diagram of an exemplary wireless speaker system consistent with the disclosed embodiments. As shown in FIG. 3, the wireless speaker system includes at least one main LED lighting device 1, at least one auxiliary LED lighting device 2, and a smart terminal 3. The main LED lighting device 1 establishes a connection with the smart terminal 3 through the Bluetooth module 13. Data sent by the smart terminal 3 is transmitted to the main LED lighting device. Then, the data is transmitted to the auxiliary LED lighting device 2 through the main LED lighting device 1. The auxiliary LED lighting device 2 sends feedback data to the smart terminal 3 through the main LED lighting device 1. The data transmitted between the smart terminal 3 and the main LED lighting device 1 includes audio data and control data. The audio data is transmitted through Advanced Audio Distribution Profile (A2DP). This profile defines how multimedia audio can be streamed from one device to another over a Bluetooth connection. The control data is transmitted through Serial Port Profile (SPP).

The main LED lighting device 1 and the auxiliary LED lighting device 2 form a multichannel wireless speaker system through their respective wireless audio module 14, such that a multi-channel audio signal can be played through the LED lighting device.

In an exemplary embodiment, the wireless speaker system includes seven auxiliary LED lighting devices 2. The number of the auxiliary LED lighting devices can be configured according to needs. For example, multiple LED lighting devices are used to form a wireless speaker system with 2.0, 2.1, 4.1, 5.1, 7.1 sound channels.

In addition, the smart terminal 3 may be one of a mobile phone, a tablet personal computer (PC), a desktop computer, an Ultrabook, a smart TV and a cloud server.

Figure 4:
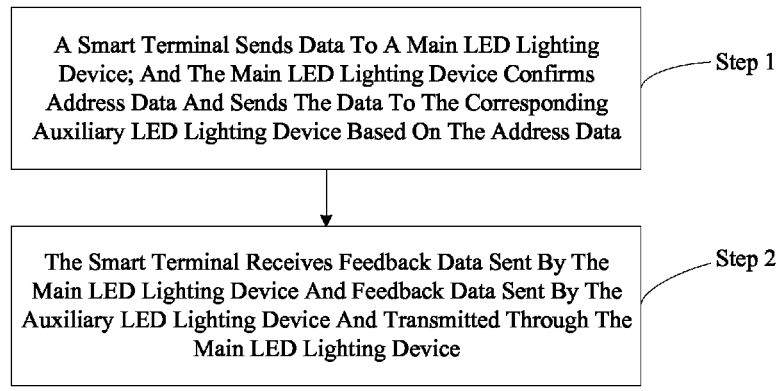
FIG. 4 illustrates a flow chart of an exemplary process for wireless data transmission between a smart terminal and an LED lighting device consistent with the disclosed embodiments.

FIG. 4 illustrates a flow chart of an exemplary process for wireless data transmission between a smart terminal and an LED lighting device consistent with the disclosed embodiments. The LED lighting device includes a main LED lighting device and at least one auxiliary LED lighting device. Each LED lighting device has its own address information. As shown in FIG. 4, the process includes the following steps.

Step 1: the smart terminal sends data to the main LED lighting device; and the main LED lighting device confirms the address information and sends the data to the corresponding auxiliary LED lighting device based on the address information.

Step 2: the smart terminal receives feedback data sent by the main LED lighting device and feedback data sent by the auxiliary LED lighting device and transmitted through the main LED lighting device.

Comparing to existing technologies, in the present embodiment, the Bluetooth module 13 is only placed in the main LED lighting device 1, but not placed in the auxiliary LED lighting device 2. Further, the bandwidth of the wireless audio transmission from the main LED lighting device to the auxiliary LED lighting device is exclusive audio transmission bandwidth, which minimizes alterations to the original signals and improves transitions between the audio channels.

In various embodiments, the main LED lighting device can be configured as one single device. For example, the at least one power supply unit, the wireless audio module, the electroacoustic conversion unit, and the LED lighting module, can be integrated into the one LED lighting device to form the single device. Accordingly, the multifunctional speaker system can include a plurality of the LED lighting devices each configured as one single device.

In an exemplary LED lighting device, the electroacoustic conversion unit can be integrated together with the driver circuit of the LED power supply module to save space and to reduce wire loss of a distributed design. In one embodiment, to ensure wireless audio module functions as the wireless transceiver module as desired, an embedded antenna can be included in the integrated LED lighting device. The embedded antenna can be configured to fit a shape of the lamp body of the LED lighting device without increasing the size of the resultant device and to maintain the design of the resulting device.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

A wireless speaker system includes at least one main light emitting diode (LED) lighting device including a Bluetooth module and a wireless audio module. The system also includes at least one auxiliary LED lighting device including the wireless audio module. Further, the system includes a smart terminal. The main LED lighting device is wirelessly connected to the smart terminal through the Bluetooth module. Data sent by the smart terminal is transmitted to the main LED lighting device, and then the data is transmitted to the auxiliary LED lighting device through the Bluetooth module in the main LED lighting device. The auxiliary LED lighting device sends feedback data to the smart terminal through the main LED lighting device.

Comparing to existing technologies, the Bluetooth module is only set in the main LED lighting device, whereas the Bluetooth module is not set in the auxiliary LED lighting device. The frequencies of the wireless audio transmissions from the main LED lighting device to the auxiliary LED lighting device are for exclusive audio transmission. This improves the originality of the audio signals and transitions between the audio channels.

In some embodiments, the smart terminal may control the lighting and the audio of the LED lighting devices together. For example, a user may select a lighting color for one audio file. The smart terminal may send the audio data and the control data to the main LED lighting device. The main LED lighting device may then transmit the audio data and control data to the auxiliary LED lighting devices. The LED lighting devices may provide the lighting specified in the control data and may play the audio data. In some embodiment, the smart terminal may also use a software application to control the lighting so that the LED lighting devices may "pulse" the lighting with the audio rhythms, or change colors or brightness when certain audio data are being played.

In some embodiments, the LED lighting devices may include one or more sensors for detecting objects or movements of objects in a room. The main LED lighting device may receive data from the sensors directly or through the auxiliary LED lighting devices. For example, in a room using multiple LED lighting devices to implement a wireless multifunctional audio system, the sensors integrated in the LED lighting devices may detect the position and movements of the a person in the room. The audio system may then adjust the LED lighting device(s) close to the person and the LED lighting device(s) far away from the person accordingly to various algorithms to better broadcast the audio signals. For example, the main LED lighting device may amplify certain frequency bands close to the person. In another example, the main LED lighting device may also adjust the lighting (e.g., dimming) in the LED lighting devices far away from the person. The main LED lighting device may also receive instructions from the smart terminal to adjust the characteristics of the lighting (color, brightness, color temperature, etc.) or audio (volume, amplifying certain frequency ranges, etc.) in certain positions.

In some embodiments, an RF module may be added to the LED lighting device. The RF module may enable users to control the LED lighting device remotely, such as switching the device on/off, adjusting light and sound settings, etc. The RF module may also connect the LED lighting device to the internet to stream music online.

REFERENCE SIGN LIST

Main LED lighting device 1
Auxiliary LED lighting device 2
Smart terminal 3
Power supply module 10
Light emitting module 11
Electroacoustic conversion unit 12
Bluetooth module 13
Wireless audio module 14

What is claimed is:

1. A wireless speaker system, comprising:
   at least one main light emitting diode (LED) lighting device including a wireless communication module using radio waves having a waveband in a range from 2.4 GHz to 2.485 GHz and a wireless audio module;
   at least one auxiliary LED lighting device including a wireless audio module; and
   a smart terminal configured to send data to the main LED lighting device through the wireless communication module in the main LED lighting device,
   wherein:
   the main LED lighting device transmits the data to and receives feedback data from the auxiliary LED lighting device through the wireless audio module in the main LED lighting device and the wireless audio module in the auxiliary LED lighting device, and
   the main LED lighting device sends the feedback data to the smart terminal through the wireless communication module in the main LED lighting device.

2. The system according to claim 1, wherein the data transmitted between the smart terminal and the main LED lighting device includes audio data and control data.

3. The system according to claim 2, wherein the audio data is transmitted through Advanced Audio Distribution Profile (A2DP).

4. The system according to claim 2, wherein the control data is transmitted through Serial Port Profile (SPP).

5. The system according to claim 1, wherein the smart terminal is one of a mobile phone, a tablet personal computer, a desktop computer, an Ultrabook, a smart TV and a cloud server.

6. A wireless data transmission method using at least one main LED lighting device and at least one auxiliary LED lighting device, comprising:
   receiving, by the main LED lighting device, data sent from a smart terminal through a wireless communication module using radio waves having a waveband in a range from 2.4 GHz to 2.485 GHz;
   sending, by the main LED lighting device, the data from the smart terminal to the auxiliary LED lighting device through a wireless audio module in the main LED lighting device;
   receiving, by the main LED lighting device, feedback data from the auxiliary LED lighting device through the wireless audio module in the main LED lighting device; and
   transmitting, by the main LED lighting device, the feedback data to the smart terminal through the wireless communication module.

7. The method according to claim 6, wherein the data transmitted between the smart terminal and the main LED lighting device includes audio data and control data.

8. The method according to claim 7, wherein the audio data is transmitted through Advanced Audio Distribution Profile (A2DP).

9. The method according to claim 7, wherein the control data is transmitted through Serial Port Profile (SPP).

10. An LED lighting and audio system, comprising:
    at least one main light emitting diode (LED) lighting device including an LED lighting module, a wireless communication module using radio waves having a waveband in a range from 2.4 GHz to 2.485 GHz, and a wireless audio module;
    at least one auxiliary LED lighting device including an LED lighting module and a wireless audio module; and
    a smart terminal configured to send data to the main LED lighting device through the wireless communication module in the main LED lighting device to control lighting and audio,
    wherein:
    the main LED lighting device transmits the data to and receives feedback data from the auxiliary LED lighting device through the wireless audio module in the main LED lighting device and the wireless audio module in the auxiliary LED lighting device, and
the main LED lighting device sends the feedback data to the smart terminal through the wireless communication module in the main LED lighting device.

11. The system according to claim 10, wherein the data transmitted between the smart terminal and the main LED lighting device includes audio data and control data.

12. The system according to claim 10, wherein the smart terminal controls brightness of the main LED lighting device and the auxiliary LED lighting device.

13. The system according to claim 11, wherein the smart terminal controls audio of the main LED lighting device and the auxiliary LED lighting device.

14. The system according to claim 10, wherein the smart terminal controls the lighting and audio in response to the feedback data received from the main LED lighting device and the auxiliary LED lighting device.

15. The system according to claim 11, wherein the audio data is transmitted through Advanced Audio Distribution Profile (A2DP).

16. The system according to claim 11, wherein the control data is transmitted through Serial Port Profile (SPP).

* * * * *